US012682492B2

(12) United States Patent
Stahulak et al.

(10) Patent No.: US 12,682,492 B2
(45) Date of Patent: Jul. 14, 2026

(54) PROVIDING LINE OF SIGHT VISUALIZATION FROM AN ORIGINATING POINT

(71) Applicant: AT&T Intellectual Property I, L.P., Atlanta, GA (US)

(72) Inventors: Charles Stahulak, Chicago, IL (US); Daniel Redmond, Elk Grove, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 459 days.

(21) Appl. No.: 17/817,524

(22) Filed: Aug. 4, 2022

(65) Prior Publication Data

US 2024/0046517 A1 Feb. 8, 2024

(51) Int. Cl.
| | |
|---|---|
| *G06T 7/80* | (2017.01) |
| *G06T 7/60* | (2017.01) |
| *H04W 16/18* | (2009.01) |

(52) U.S. Cl.
CPC .................. *G06T 7/80* (2017.01); *G06T 7/60* (2013.01); *H04W 16/18* (2013.01); *G06T 2207/30181* (2013.01); *G06T 2207/30232* (2013.01)

(58) Field of Classification Search
CPC ... G06T 7/80; G06T 7/60; G06T 2207/30181; G06T 2207/30232; H04W 16/18
See application file for complete search history.

(56) References Cited

FOREIGN PATENT DOCUMENTS

EP 3287736 A1 * 2/2018 ............... F41G 3/04

OTHER PUBLICATIONS

Google Workspace, Google Earth Pro Viewshed Tool, https://www.youtube.com/watch?v=9SP1O8q2Lng, Apr. 22, 2013 (Year: 2013).*
R/amateurradio, Tool for determining if there is a line-of-sight path between two antennas?, https://www.reddit.com/r/amateurradio/comments/uunuzh/tool_for_determining_if_there_is_a_lineofsight/?rdt=50835, 2021 (Year: 2021).*
El-Ashmawy, Investigation of the Accuracy of Google Earth Elevation Data, Artificial Satellites, vol. 51 , No. 3—2016, DOI: 10.1515/arsa-2016-0008 (Year: 2016).*
Teaching Junction, How to Add and Customize Markers in Excel Charts, https://www.youtube.com/watch?v=dpqk5dtxPdg, Feb. 11, 2021 (Year: 2021).*
ArcGIS, ArcGIS Pro Exploratory Analysis—Line of Sight Tool Basics, https://www.youtube.com/watch?v=KEpRJ4j85SE, Nov. 16, 2020 (Year: 2020).*
Anderson, The Application of Land Use/Land Cover (Clutter) Data to Wireless Communication System Design, 2008 EDX Wireless (Year: 2008).*

(Continued)

*Primary Examiner* — Vu Le
*Assistant Examiner* — Lei Zhao

(57) ABSTRACT
A method includes receiving a first set of coordinates associated with a first geostationary point, identifying a first plurality of geostationary points having a clear line of sight to the first geostationary point and a second plurality of points lacking the clear line of sight to the first geostationary point, and generating a map in which the first plurality of geostationary points is depicted in a first visual style. Optionally, the map may further depict the second plurality of geostationary points in a second visual style different from the first visual style.

20 Claims, 4 Drawing Sheets

300

304                                    302

(56)  References Cited

OTHER PUBLICATIONS

Idaho, ArcGIS Pro—Labeling Traverse with Quadrant Bearing and Distance, https://www.youtube.com/watch?v=BNieQeDat7c, 2020 (Year: 2020).*

HDPath, HDPath Antenna Elevation, https://www.softwright.com/faq/support/hdp_antelev.html, 2005 (Year: 2005).*

Vogg, Select points on maps, https://r-vogg-blog.netlify.app/posts/2021-02-12-select-points-on-maps/, Feb. 11, 2021 (Year: 2021).*

* cited by examiner

<u>200</u>

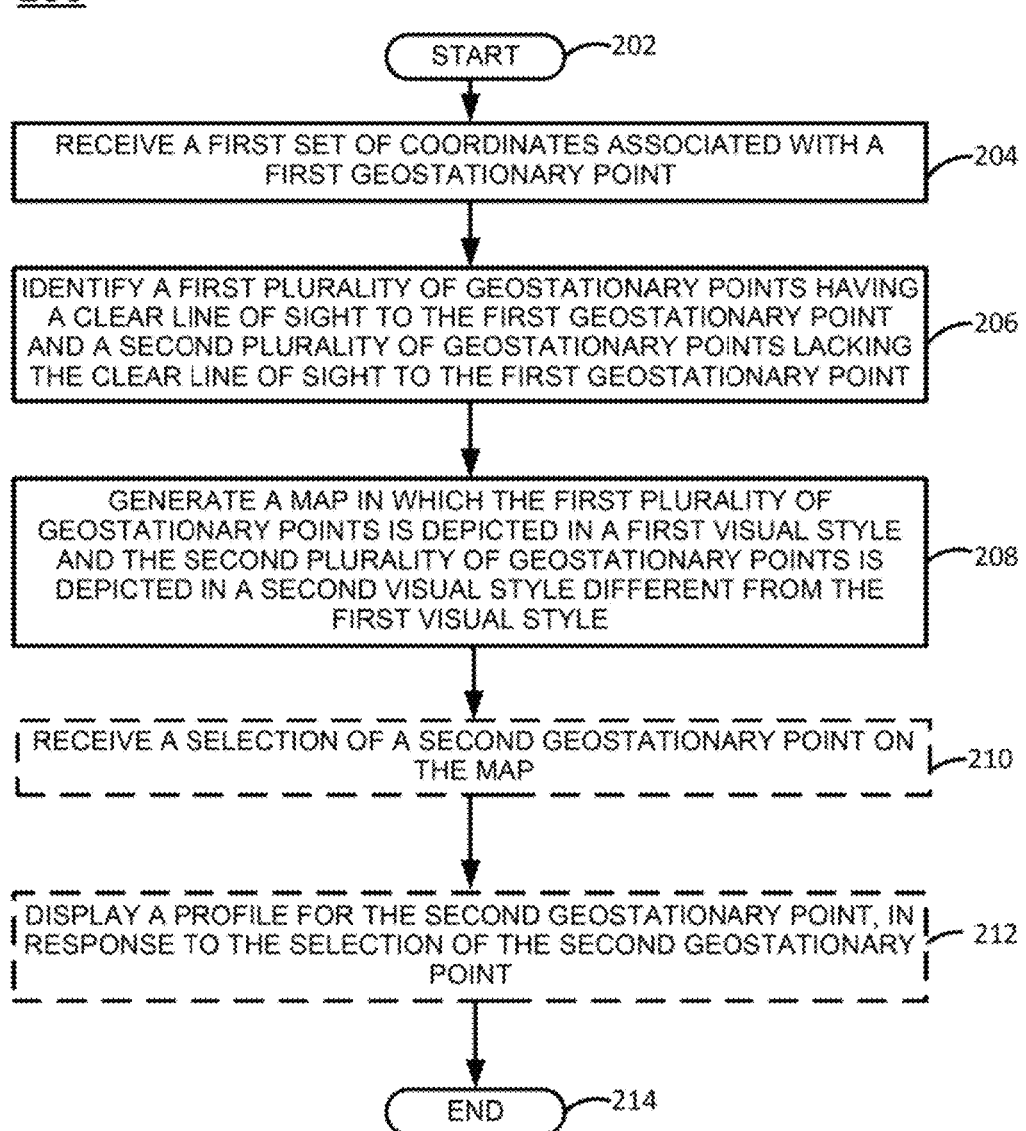

START ~202

RECEIVE A FIRST SET OF COORDINATES ASSOCIATED WITH A FIRST GEOSTATIONARY POINT ~204

IDENTIFY A FIRST PLURALITY OF GEOSTATIONARY POINTS HAVING A CLEAR LINE OF SIGHT TO THE FIRST GEOSTATIONARY POINT AND A SECOND PLURALITY OF GEOSTATIONARY POINTS LACKING THE CLEAR LINE OF SIGHT TO THE FIRST GEOSTATIONARY POINT ~206

GENERATE A MAP IN WHICH THE FIRST PLURALITY OF GEOSTATIONARY POINTS IS DEPICTED IN A FIRST VISUAL STYLE AND THE SECOND PLURALITY OF GEOSTATIONARY POINTS IS DEPICTED IN A SECOND VISUAL STYLE DIFFERENT FROM THE FIRST VISUAL STYLE ~208

RECEIVE A SELECTION OF A SECOND GEOSTATIONARY POINT ON THE MAP ~210

DISPLAY A PROFILE FOR THE SECOND GEOSTATIONARY POINT, IN RESPONSE TO THE SELECTION OF THE SECOND GEOSTATIONARY POINT ~212

END ~214

PROVIDING LINE OF SIGHT VISUALIZATION FROM AN ORIGINATING POINT

The present disclosure relates generally to mobile communications, and relates more particularly to devices, non-transitory computer-readable media, and methods for providing line of sight visualization from an originating point.

BACKGROUND

A cellular communications network comprises a network of cellular phones which communicate with the telephone network by radio waves through a local antenna at a cellular base station. A cellular base station (or "base transceiver station" in global system for mobile communications (GSM) networks) is a cellular-enabled mobile device site (e.g., a radio mast, a tower, or another raised structure) on which antennas and electronic communications equipment are mounted to create a cell (i.e., a coverage area in which service is provided) in the cellular communications network. Typically, a cellular base station is connected to the service provider's mobile telephone switching offices (MTSOs), data centers, and central offices (which are connected between other central offices and customers in a hub-and-spoke configuration) via optical fibers. Telecommunications services, including cellular communications services from the cellular base stations, are provided to customers through these central offices. Microwave signals may be used to carry various services including data science and software services (DS3), Ethernet, and other services, and may also be used for cellular base station backhaul.

SUMMARY

The present disclosure broadly discloses methods, computer-readable media, and systems for providing line of sight visualization from an originating point. In one example, a method performed by a processing system including at least one processor includes receiving a first set of coordinates associated with a first geostationary point, identifying a first plurality of geostationary points having a clear line of sight to the first geostationary point and a second plurality of points lacking the clear line of sight to the first geostationary point, and generating a map in which the first plurality of geostationary points is depicted in a first visual style. Optionally, the map may further depict the second plurality of geostationary points in a second visual style different from the first visual style.

In another example, a non-transitory computer-readable medium may store instructions which, when executed by a processing system including at least one processor, cause the processing system to perform operations. The operations may include receiving a first set of coordinates associated with a first geostationary point, identifying a first plurality of geostationary points having a clear line of sight to the first geostationary point and a second plurality of points lacking the clear line of sight to the first geostationary point, and generating a map in which the first plurality of geostationary points is depicted in a first visual style. Optionally, the map may further depict the second plurality of geostationary points in a second visual style different from the first visual style.

In another example, an apparatus may include a processing system including at least one processor and a non-transitory computer-readable medium storing instructions which, when executed by the processing system, cause the processing system to perform operations. The operations may include receiving a first set of coordinates associated with a first geostationary point, identifying a first plurality of geostationary points having a clear line of sight to the first geostationary point and a second plurality of points lacking the clear line of sight to the first geostationary point, and generating a map in which the first plurality of geostationary points is depicted in a first visual style. Optionally, the map may further depict the second plurality of geostationary points in a second visual style different from the first visual style.

BRIEF DESCRIPTION OF THE DRAWINGS

The teachings of the present disclosure can be readily understood by considering the following detailed description in conjunction with the accompanying drawings, in which:

FIG. 2 illustrates a flowchart of an example method for providing line of sight visualization from an originating point, in accordance with the present disclosure;

To facilitate understanding, similar reference numerals have been used, where possible, to designate elements that are common to the figures.

DETAILED DESCRIPTION

Figure 1:
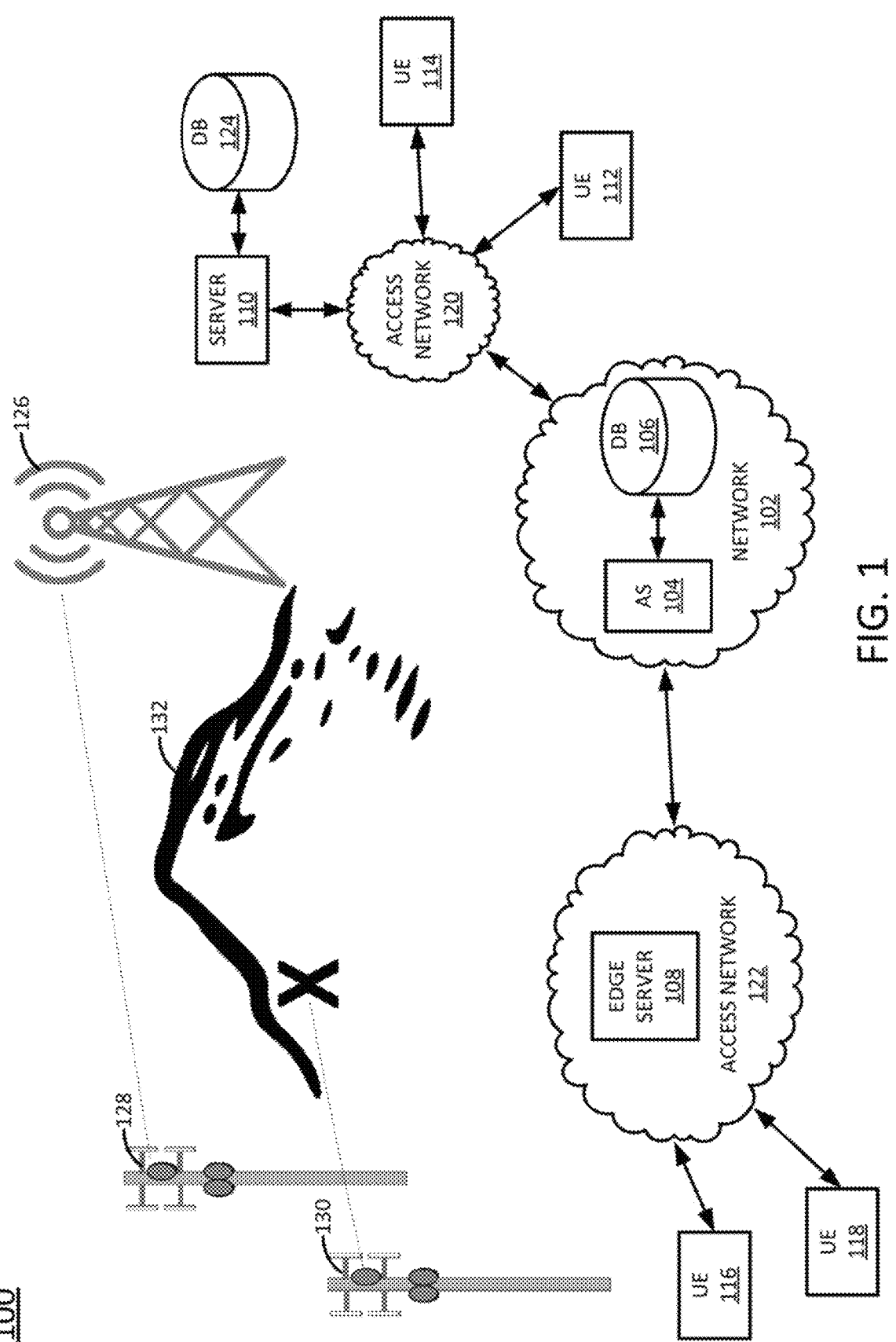
FIG. 1 illustrates an example system in which examples of the present disclosure may operate.

The present disclosure broadly discloses methods, computer-readable media, and systems for providing line of sight visualization from an originating point. As discussed above, a cellular base station is typically connected to a cellular communications service provider's mobile telephone switching offices (MTSOs), data centers, and central offices via optical fibers. However, in some areas such as rural and/or mountainous areas, running optical fiber may not be cost effective. Thus, to increase coverage in an area where the deployment of optical fiber is not feasible, the cellular communications service provider may instead rely on microwave radio to act like fiber. In this case, the equipment typically supported by a cellular base station is instead connected to a microwave radio dish which is positioned between two cellular base stations.

In order to provide the greatest quality reception to mobile devices within a cell served by a microwave radio dish, the microwave radio dish should have relatively clear lines of sight (i.e., unobstructed by objects that can interfere with or block microwave signals, such as trees, buildings, and the like) to the cellular base stations between which the microwave radio dish is positioned. Typically, when a microwave radio dish is to be deployed in this manner, the cellular communications service provider will use a software application to determine a height at which to position the microwave radio dish for a clear line of sight. Conventional software applications require that a user provide two sets of coordinates, i.e., a first set of coordinates for a location of an existing cellular base station and a second set of coordinates for a proposed location for the microwave radio dish. The software application then determines whether a clear line of sight exists between the two sets of coordinates.

If the software application determines that there is no clear line of sight between the two sets of coordinates, then the user must provide a new set of coordinates (e.g., the same first set of coordinates plus an alternate second set of coordinates for an alternate proposed location for the microwave radio dish). This process may be repeated until the software application confirms a clear line of sight between a proposed location for the microwave radio dish and the cellular base station. Thus, although conventional software applications for determining line of sight may be more efficient than performing manual surveys, using these software applications still involves much trial and error, which may be undesirable in situations where time is critical (e.g., deploying a microwave radio dish to restore cellular service after a natural disaster). Moreover, it is possible that a better location for the microwave radio dish may be overlooked simply because the user did not provide the coordinates for the better location.

Examples of the present disclosure allow a user evaluating potential locations for a microwave radio dish to provide a single set of coordinates for a single location (e.g., a location of a cellular base station). A visual display may then be generated on a map to show areas that have clear line of sight and no line of sight from the input location, and to easily differentiate between the areas with clear line of sight and the areas with no line of sight (e.g., using varying colors, shading, or other visual aids). Thus, examples of the present disclosure provide line of sight evaluations in a faster and more efficient manner than conventional software applications, by essentially evaluating a plurality of potential locations at once. Examples of the present disclosure tie into existing terrain mapping applications such as United States Geological Survey (USGS), commercial global positioning system (GPS) applications, and the like.

Moreover, although examples of the present disclosure are discussed within the illustrative context of identifying locations for microwave radio dishes, these examples may also be extended to other fields as well. For instance, examples of the present disclosure may have application in law enforcement, the military, surveying, civil engineering, microwave/wireless engineering, site planning, sniper and countermeasure planning, city planning, hunting and gaming, and search and rescue. Most, if not all, of these applications utilize both GPS and topological mapping software for regular operations. These and other aspects of the present disclosure are discussed in greater detail below in connection with the examples of FIGS. 1-4.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, 5G and the like related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, or an enterprise network comprising infrastructure for computing and communications services of a business, an educational institution, a governmental service, or other enterprises. The network 102 may be in communication with one or more access networks 120 and 122, and the Internet (not shown). In one example, network 102 may combine core network components of a cellular network with components of a triple play service network; where triple-play services include telephone services, Internet or data services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over internet Protocol (VoIP) telephony services. Network 102 may further comprise a broadcast television network, e.g., a traditional cable provider network or an internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video on demand (VoD) server, and so forth.

In one example, the access networks 120 and 122 may comprise broadband optical and/or cable access networks, Local Area Networks (LANs), wireless access networks (e.g., an IEEE 802.11/Wi-Fi network and the like), cellular access networks, Digital Subscriber Line (DSL) networks, public switched telephone network (PSTN) access networks, $3^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like.

Figure 4:
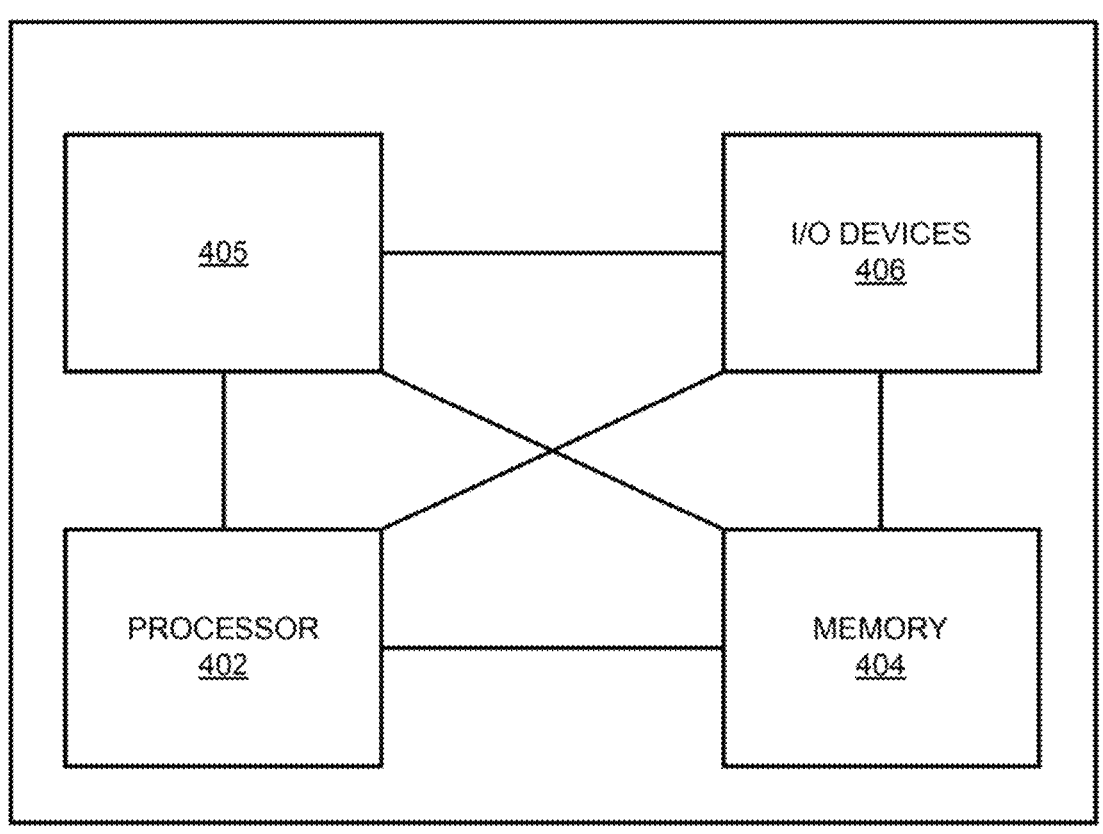
FIG. 4 illustrates an example of a computing device, or computing system, specifically programmed to perform the steps, functions, blocks, and/or operations described herein.

In accordance with the present disclosure, network 102 may include an application server (AS) 104, which may comprise a computing system or server, such as computing system 400 depicted in FIG. 4, and may be configured to provide one or more operations or functions in connection with examples of the present disclosure for providing line of sight visualization from an originating point. The network 102 may also include a database (DB) 106 that is communicatively coupled to the AS 104.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure. Thus, although only a single application server (AS) 104 and a single database (DB) 106 are illustrated, it should be noted that any number of servers may be deployed, and which may operate in a distributed and/or coordinated manner as a processing system to perform operations in connection with the present disclosure.

In one example, AS 104 may comprise a centralized network-based server that may access various data sources (e.g., Unites States Geological Survey data, commercial global positioning system data, topographical data, clutter data, satellite data, three-dimensional building data, etc.). The AS 104 may utilize the data from these various data sources in order to determine whether a clear line of sight exists between various pairs of geostationary points. The AS 104 may also utilize the data in order to generate a map that graphically illustrates areas of a geographic location that have clear line of sight and/or no line of sight to a single specified geostationary point, as discussed in greater detail below.

In one example, AS 104 may comprise a physical storage device (e.g., a database server), to store map data (e.g., Unites States Geological Survey data, commercial global positioning system data, topographical data, clutter data, satellite data, three-dimensional building data, etc.). For instance, the AS 104 may store an index, where the index maps each point of a plurality of discrete points in a geographic location, to a profile. The profile may specify, for the point, a set of geographic coordinates, an elevation, a tilt, a bearing, and/or other information. The profile may further specify whether any structure is located at the point, such as a cellular base station, a microwave radio dish, a building, or the like.

In one example, the DB 106 may store the index, and the AS 104 may retrieve the index from the DB 106 when needed. For ease of illustration, various additional elements of network 102 are omitted from FIG. 1.

In one example, access network 122 may include an edge server 108, which may comprise a computing system or server, such as computing system 400 depicted in FIG. 4, and may be configured to provide one or more operations or functions for providing line of sight visualization from an originating point, as described herein. For instance, example method 200 for providing line of sight visualization from an originating point is illustrated in FIG. 2 and described in greater detail below.

In one example, application server 104 may comprise a network function virtualization infrastructure (NFVI), e.g., one or more devices or servers that are available as host devices to host virtual machines (VMs), containers, or the like comprising virtual network functions (VNFs). In other words, at least a portion of the network 102 may incorporate software-defined network (SDN) components. Similarly, in one example, access networks 120 and 122 may comprise "edge clouds," which may include a plurality of nodes/host devices, e.g., computing resources comprising processors, e.g., central processing units (CPUs), graphics processing units (GPUs), programmable logic devices (PLDs), such as field programmable gate arrays (FPGAs), or the like, memory, storage, and so forth. In an example where the access network 122 comprises radio access networks, the nodes and other components of the access network 122 may be referred to as a mobile edge infrastructure. As just one example, edge server 108 may be instantiated on one or more servers hosting virtualization platforms for managing one or more virtual machines (VMs), containers, microservices, or the like. In other words, in one example, edge server 108 may comprise a VM, a container, or the like.

In one example, the access network 120 may be in communication with a server 110 and database 124, as well as one or more devices, e.g., a user endpoint devices (UEs) 112 and 114. Similarly, access network 122 may be in communication with one or more devices, e.g., UEs 116 and 118. Access networks 120 and 122 may transmit and receive communications between server 110, user endpoint devices 112, 114, 116, and 118, application server (AS) 104, other components of network 102, devices reachable via the Internet in general, and so forth. In one example, any one or more of the user endpoint devices 112, 114, 116, and 118 may comprise a mobile device, a cellular smart phone, a wearable computing device (e.g., smart glasses, smart goggles, a virtual reality (VR) headset or other types of head mounted display, or the like), a laptop computer, a tablet computer, or the like (broadly an "XR device"). In one example, any one or more of the user endpoint devices 112, 114, 116, and 118 may comprise a computing system or device, such as computing system 400 depicted in FIG. 4, and may be configured to provide one or more operations or functions in connection with examples of the present disclosure for providing line of sight visualization from an originating point.

In one example, server 110 may comprise a network-based server for providing line of sight visualization from an originating point. In this regard, server 110 may comprise the same or similar components as those of AS 104 and may provide the same or similar functions. Thus, any examples described herein with respect to AS 104 may similarly apply to server 110, and vice versa. Similarly, DB 124 may comprise a remote data source storing Unites States Geological Survey data, commercial global positioning system data, topographical data, clutter data, satellite data, three-dimensional building data and/or storing any of the data stored in DB 106.

In an illustrative example, a system for providing line of sight visualization from an originating point may be provided via AS 104 and edge server 108. In one example, a human analyst or technician may engage an application on user endpoint device 112, 114, 116, or 118 to establish one or more sessions with the system, e.g., a connection to edge server 108 (or a connection to edge server 108 and a connection to AS 104). Once a session is established, the human analyst or technician may utilize the user endpoint device 112, 114, 116, or 118 to input a first geostationary point. For instance, the human analyst or technician may input the coordinates of the first geostationary point via a keyboard, microphone, camera, or other input devices of the user endpoint device 112, 114, 116, or 118. Alternatively, the human analyst or technician may tap a location on a touch screen of the user endpoint device 112, 114, 116, or 118 that corresponds to the first geostationary point (where the touch screen may display a map). In one example, the first geostationary point may correspond to the location of an existing cellular base station 126.

Figure 3:
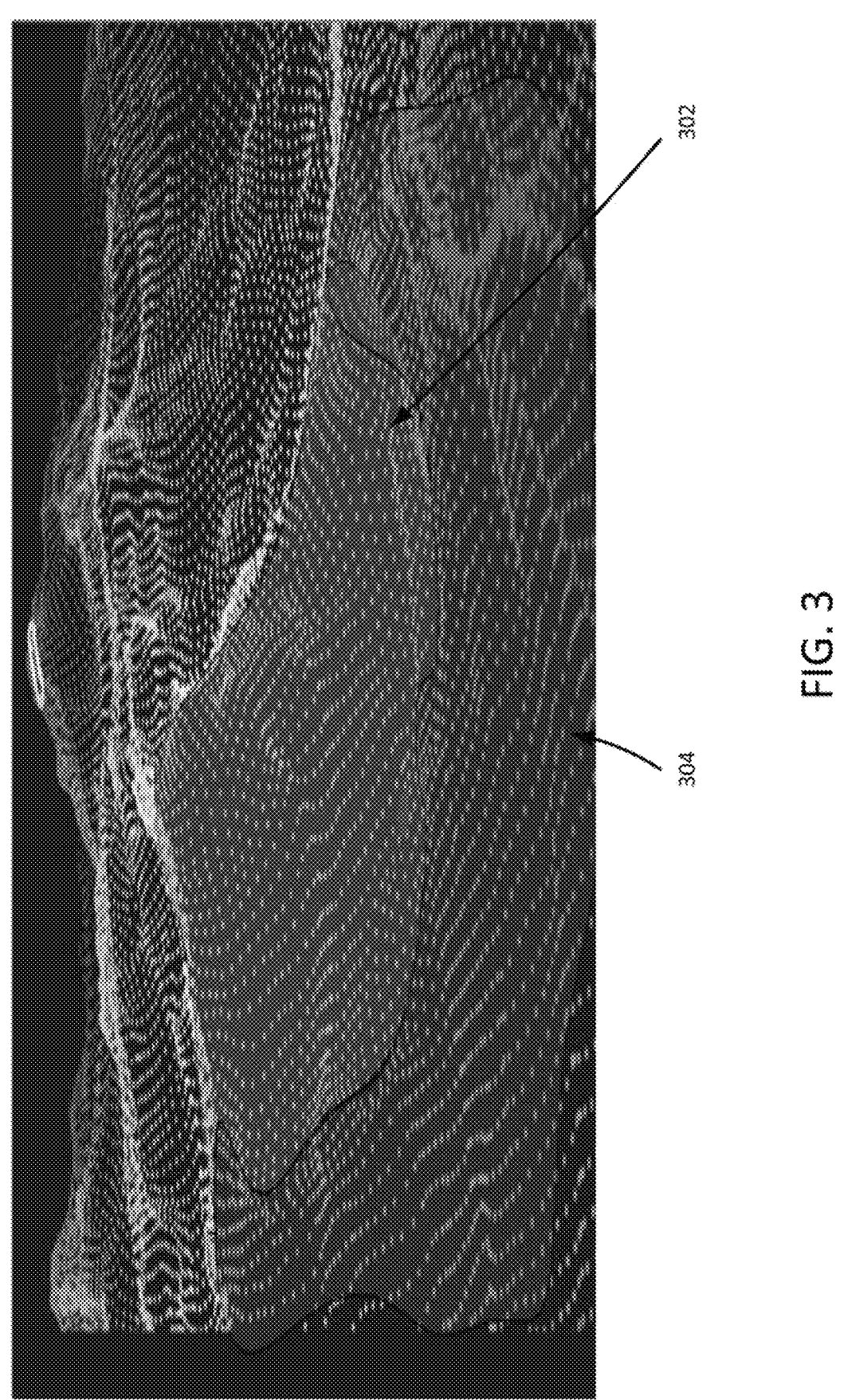
FIG. 3 illustrates a portion of an example map that may be generated according to the method of FIG. 2.

The first geostationary point may be transmitted to the AS 104. The AS 104 may access one or more data sources in order to determine a first plurality of geostationary points having clear line of sight to the first geostationary point. Any point of the first plurality of geostationary points may serve as a candidate location for a microwave radio dish 128, for example. In addition, the AS 104 may access the one or more data sources in order to determine a second plurality of geostationary points not having clear line of sight to the first geostationary point. For instance, a line of sight between any point of the second plurality of geostationary points and the first geostationary point may be obstructed (e.g., by the slope of a mountain 132 or another obstruction). In one example, the AS 104 may generate a map that plots the first plurality of geostationary points and/or the second plurality of geostationary points. The first plurality of geostationary points may be rendered on the map in a different visual style from the second plurality of geostationary points (e.g., in a different color, a different shape, or the like), so that the human analyst or technician can easily and quickly determine which points do and do not have clear line of sight to the first geostationary point. FIG. 3, for instance illustrates a portion of an example map 300 that may be generated by the AS 104.

In one example, one or both of the access networks 120 and 122 may comprise a cellular network (e.g., a 4G network and/or an LTE network, or a portion thereof, such as an evolved Uniform Terrestrial Radio Access Network (eUTRAN), an evolved packet core (EPC) network, etc., a 5G network, etc.). Thus, the communications between user endpoint devices 112, 114, 116, and 118 and/or edge server 108 may involve cellular communication via one or more base stations (e.g., eNodeBs, gNBs, or the like). However, in another example the communications may alternatively or additionally be via a non-cellular wireless communication modality, such as IEEE 802.11/Wi-Fi, or the like. For instance, one or both of access networks 120 and 122 may comprise a wireless local area network (WLAN) containing at least one wireless access point (AP), e.g., a wireless router. Alternatively, or in addition, user endpoint devices 112, 114, 116, and 118 may communicate with access networks 120 and/or 122, network 102, the Internet in general, etc., via a WLAN that interfaces with access networks 120 and/or 122.

It should also be noted that the system 100 has been simplified. Thus, it should be noted that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 120 and 122, and/or Internet may comprise a content distribution network (CDN) having ingest servers, edge servers, and the like for packet-based streaming of video, audio, or other content. Similarly, although only two access networks, 120 and 122 are shown, in other examples, access networks 120 and/or 122 may each comprise a plurality of different access networks that may interface with network 102 independently or in a chained manner. In addition, as described above, the functions of AS 104 may be similarly provided by server 110, or may be provided by AS 104 in conjunction with server 110. For instance, AS 104 and server 110 may be configured in a load balancing arrangement, or may be configured to provide for backups or redundancies with respect to each other, and so forth. Thus, these and other modifications are all contemplated within the scope of the present disclosure.

FIG. 2 illustrates a flowchart of an example method 200 for providing line of sight visualization from an originating point, in accordance with the present disclosure. In one example, the steps, functions and/or operations of the method 200 may be performed by a device as illustrated in FIG. 1, e.g., AS 104 or any one or more components thereof. In another example, the steps, functions, or operations of method 200 may be performed by a computing device or system 400, and/or a processing system 402 as described in connection with FIG. 4 below. For instance, the computing device 400 may represent at least a portion of the AS 104 in accordance with the present disclosure. For illustrative purposes, the method 200 is described in greater detail below in connection with an example performed by a processing system in an Internet service provider network, such as processing system 402.

The method 200 begins in step 202 and proceeds to step 204. In step 204, the processing system may receive a first set of coordinates associated with a first geostationary point. In one example, the first geostationary point may be the location of an existing cellular base station, where a user is trying to determine a location that has a clear line of sight to the cellular base station (e.g., for deployment of a microwave radio dish).

In one example, the first set of coordinates may comprise latitude and longitude coordinates (although in other examples, other coordinate systems may be used, such as global positioning system coordinates). In a further example, the first set of coordinates may further include a vertical or elevation component. For instance, the elevation component may comprise an above ground level (AGL) coordinate.

In one example, the coordinates may be input (e.g., in numerical form) by a user, e.g., via an input device of a user endpoint device (e.g., a keyboard, a microphone, a camera, a touch screen, or the like). For instance, the user may use an office desk top or laptop computer to input the coordinates. In another example, the user may use a mobile phone, a handheld GPS device, or another mobile device to input the coordinates from the field. In another example, rather than input the numerical coordinates, the user may simply select a location on a map that is shown on a display, where selecting the location may comprise moving a cursor to the location and clicking a mouse, moving the user's finger or stylus to the location and tapping a touch screen, or the like. Thus, the user may not necessarily need to know the precise coordinates of the first geostationary point, but may simply identify a location of the first geostationary point on a map.

In step 206, the processing system may identify a first plurality of geostationary points having a clear line of sight to the first geostationary point and a second plurality of points lacking the clear line of sight to the first geostationary point.

In one example, information as to whether a geostationary point has a clear line of sight to the first geostationary point may have been determined previously, e.g., by manual survey, drone survey, or another means, and the results of the previously determined line of sight may be stored in a database. In another example, at least some of the information as to whether a geostationary point has a clear line of sight to the first geostationary point may be obtained or determined from one or more existing third party information sources. For instance, these third party information sources may include United States Geological Survey (USGS) terrain mapping data, commercial GPS data, topological data, clutter data, satellite data, three-dimensional building data, and/or other sources.

In step 208, the processing system may generate a map in which the first plurality of geostationary points is depicted in a first visual style. The first visual style may comprise, for example, a common color with which all points of the first plurality of geostationary points are shaded (e.g., green), a common shape that all points of the first plurality of geostationary points take (e.g., circle), or the like. Thus, the user may be able to see, simply by looking for points on the map that are depicted in the first visual style, a plurality of locations that have clear line of sight to the first geostationary point. In a further example, where at least some of the first plurality of geostationary points are located near each other and not separated from each other by any points of the second plurality of geostationary points, an area of the map that encompasses multiple points of the first plurality of geostationary points may be shaded in a color indicating clear line of sight.

FIG. 3, for instance, illustrates a portion of an example map 300 that may be generated according to the method 200 of FIG. 2. As illustrated, various sections of the map 300 may be shaded in different colors. As an example, a first section 302 of the map 300 may be shaded in a first color (e.g., green). All points falling within the first section 302 may have clear line of sight to the first geostationary point.

In one example, the map may also depict the second plurality of geostationary points in a second visual style different from the first visual style (e.g., in a different color, a different shape, or the like). For instance, if the first plurality of geostationary points are depicted in green, then the second plurality of geostationary points may be depicted in red. Similarly, if the first plurality of geostationary points are depicted as circles, then the second plurality of geostationary points may be depicted as triangles. Thus, the user may be able to easily differentiate, simply by looking at the differences in the points on the map, which locations have clear line of sight to the first geostationary point and which locations do not have clear line of sight to the first geostationary point.

In a further example, various sections of the map may be shaded in different colors as discussed in connection with FIG. 3. For instance, referring back to FIG. 3, a second section 304 of the map 300 may be shaded in a second color (e.g., red). All points falling within the second section 304 may lack clear line of sight to the first geostationary point (e.g., may be obstructed with respect to the first geostationary point). Thus, the map 300 may display all points of the first plurality of geostationary points and all points of the second plurality of geostationary points simultaneously.

In one example, the map layers the first plurality of geostationary points (and the second plurality of geostationary points, if included) over topographical, clutter, satellite, and/or three-dimensional building data in order to provide a real world and real time view of which locations do and do not have clear line of sight to the first geostationary point.

In optional step 210 (illustrated in phantom), the processing system may receive a selection of a second geostationary point on the map. In one example, the second geostationary point is one of the first plurality of geostationary points or the second plurality of geostationary points. In one example, the selection may be received when the user moves a cursor over the second geostationary point on a display and clicks a mouse, moves a finger or stylus over the second geostationary point and taps a touch screen, or the like.

In optional step 212 (illustrated in phantom), the processing system may display a profile for the second geostationary point, in response to the selection of the second geostationary point. In one example, the profile includes information about the second geostationary point's line of sight to the first geostationary point. For instance, in one example, the information displayed in the profile may include one or more of: whether the second geostationary point has a clear line of sight to the first geostationary point (e.g., YES or NO), a microwave path profile for a path connecting the second geostationary point to the first geostationary point, a bearing of the second geostationary point, a tilt of the second geostationary point, a distance of the second geostationary point from the first geostationary point, and a required elevation of the second geostationary point to ensure clear line of sight to the first geostationary point.

The method 200 may end in step 214.

Examples of the present disclosure may therefore allow line of sight information for multiple geostationary points to be easily and simultaneously visualized. This will greatly simplify the process of identifying points that have clear line of sight to a target point, such as a location of a cellular base station. For instance, a user need only provide the location of the target point, and a map may be generated that shows a plurality of geostationary points within a geographic area that have clear line of sight to the target point, as well as a plurality of geostationary points within the geographic area that do not have clear line of sight to the target point. Thus, points with clear lines of sight can be identified quickly and easily, thereby reducing the amount of time typically needed to identify candidate locations for microwave radio dishes and also reducing the changes of sub-optimal locations being selected.

Moreover, as discussed above, although examples of the present disclosure are discussed within the context of line of sight analyses for microwave radio dishes, it will be appreciated that the examples disclosed herein may provide similar advantages for other applications where line of sight between two points requires confirmation. For instance, examples of the present disclosure could be implemented to simplify sniper or military operations, such as active shooter or hostage responses. In such a case, a suspected attacker's location (or probably location) could be plotted on a map. Examples of the present disclosure could be used to enhance the map in a manner that makes it easy to identify safe locations (or cover) as well as unsafe locations (locations where the attacker might have access to a friendly target). This information can assist military and law enforcement personnel quickly in determining optimal locations from which to return fire, perform reconnaissance, or deploy friendly snipers.

In another example, examples of the present disclosure could be implemented to assist with city planning and site planning activities. In this case, when a structure is proposed for development, examples of the present disclosure may be used to provide visibility maps to determine that structure's impact on the city skyline, visibility to surrounding neighborhoods, and the like. This may assist city planners in reducing the impact of "eye sores" and may facilitate the satisfaction of permitting requirements by identifying locations where structures may be strategically placed to meet permit agency requirements.

In another example, examples of the present disclosure could be implemented to select locations for wind turbines, which, although useful, are often considered to be unsightly. In this case, a proposed location for a wind turbine (or other structure considered to be necessary but unsightly) could be plotted on a map. Examples of the present disclosure could be utilized to enhance the map to identify which areas of a surrounding region will and will not have views of the wind turbine (in some cases, certain areas may be zoned to have no visibility if such structures).

In another example, examples of the present disclosure could be implemented to assist hunting, gaming, and search and rescue operations. For instance, a hunter may wish to identify an optimal location for a stand or camp (e.g., a location with high ground and sufficient cover). The hunter may plot their location on a map, and examples of the present disclosure could be used to enhance the map with the location's visibility over the surrounding area. This functionality may help with planning by allowing the easy identification of safe, predetermined locations from which to hunt. Similarly, a person in need of rescue (e.g., a hiker who is lost or injured in an unfamiliar location) may plot their location on a map, and examples of the present disclosure may quickly identify nearby locations with visibility to roads, lookout stations, landmarks, or other locations where help might be provided. These locations could be identified in real time or in advance (so that safe locations along a planned route are known prior to being needed).

It should be noted that the method 200 may be expanded to include additional steps or may be modified to include additional operations with respect to the steps outlined above. In addition, although not specifically specified, one or more steps, functions, or operations of the method 200 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 2 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

FIG. 4 depicts a high-level block diagram of a computing device or processing system specifically programmed to perform the functions described herein. As depicted in FIG. 4, the processing system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for providing line of sight visualization from an originating point, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200 or the entire method 200 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one example, instructions and data for the present module or process 405 for providing line of sight visualization from an originating point (e.g., a software program comprising computer-executable instructions) can be loaded into memory 404 and executed by hardware processor element 402 to implement the steps, functions, or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for providing line of sight visualization from an originating point (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:

receiving, by a processing system including at least one processor, a first set of coordinates associated with a first geostationary point;

identifying, by the processing system, a first plurality of geostationary points having a clear line of sight to the first geostationary point and a second plurality of geostationary points lacking the clear line of sight to the first geostationary point;

generating, by the processing system, a map in which the first plurality of geostationary points is depicted in a first visual style, wherein the map layers the first plurality of geostationary points and the second plurality of geostationary points over at least two of: topographical data, clutter data, satellite data, or three-dimensional building data;

receiving, by the processing system, a selection of a second geostationary point on the map; and displaying, by the processing system, a profile for the second geostationary point, in response to the selection of the second geostationary point, wherein the profile specifies a required elevation of the second geostationary point to ensure the clear line of sight to the first geostationary point.

2. The method of claim 1, wherein the first geostationary point corresponds to a location of an existing cellular base station.

3. The method of claim 2, wherein each point of the first plurality of geostationary points corresponds to a candidate location for a microwave radio dish.

4. The method of claim 1, wherein the first set of coordinates includes an elevation component.

5. The method of claim 1, wherein the first set of coordinates is received via a selection by a user on the map.

6. The method of claim 1, wherein the identifying is performed using data acquired from a third party information source.

7. The method of claim 6, wherein the third party information source is at least one of: a United States geological survey database, a commercial global positioning system, a topological data source, a clutter data source, a satellite data source, or a three-dimensional building data source.

8. The method of claim 1, wherein the map further depicts the second plurality of geostationary points in a second visual style different from the first visual style.

9. The method of claim 8, wherein the map layers the first plurality of geostationary points and the second plurality of geostationary points over the topographical data.

10. The method of claim 8, wherein the map displays all points of the first plurality of geostationary points and all points of the second plurality of geostationary points simultaneously.

11. The method of claim 8, wherein each point of the first plurality of geostationary points is displayed on the map as a discrete point having a first shape, and each point of the second plurality of geostationary points is displayed on the map as a discrete point having a second shape different from the first shape.

12. The method of claim 1, wherein the selection of the second geostationary point is received via a selection by a user on the map.

13. The method of claim 1, wherein the first geostationary point comprises a candidate location for a structure, and the first plurality of geostationary points comprises a plurality of locations from which the structure would be visible if the structure is deployed at the first geostationary point.

14. The method of claim 1, wherein the profile additionally specifies a microwave path profile for a path connecting the second geostationary point to the first geostationary point.

15. The method of claim 1, wherein the profile additionally specifies a distance of the second geostationary point from the first geostationary point.

16. The method of claim 1, wherein the profile additionally specifies a bearing of the second geostationary point.

17. The method of claim 1, wherein the profile additionally specifies a tilt of the second geostationary point.

18. The method of claim 1, wherein the second geostationary point is selected from among the first plurality of geostationary points and the second plurality of geostationary points.

19. A non-transitory computer-readable medium storing instructions which, when executed by a processing system including at least one processor, cause the processing system to perform operations, the operations comprising:

receiving a first set of coordinates associated with a first geostationary point;

identifying a first plurality of geostationary points having a clear line of sight to the first geostationary point and a second plurality of geostationary points lacking the clear line of sight to the first geostationary point;

generating a map in which the first plurality of geostationary points is depicted in a first visual style, wherein the map layers the first plurality of geostationary points and the second plurality of geostationary points over at least two of: topographical data, clutter data, satellite data, or three-dimensional building data;

receiving a selection of a second geostationary point on the map; and displaying a profile for the second geostationary point, in response to the selection of the second geostationary point, wherein the profile specifies a required elevation of the second geostationary point to ensure the clear line of sight to the first geostationary point.

20. An apparatus comprising:

a processing system including at least one processor; and a non-transitory computer-readable medium storing instructions which, when executed by the processing system, cause the processing system to perform operations, the operations comprising:

receiving a first set of coordinates associated with a first geostationary point;

identifying a first plurality of geostationary points having a clear line of sight to the first geostationary point and a second plurality of geostationary points lacking the clear line of sight to the first geostationary point;

generating a map in which the first plurality of geostationary points is depicted in a first visual style, wherein the map layers the first plurality of geostationary points and the second plurality of geostationary points over at least two of: topographical data, clutter data, satellite data, or three-dimensional building data;

receiving a selection of a second geostationary point on the map; and displaying a profile for the second geostationary point, in response to the selection of the second geostationary point, wherein the profile specifies a required elevation of the second geostationary point to ensure the clear line of sight to the first geostationary point.

* * * * *